Patented Apr. 22, 1930

1,755,678

REISSUED

UNITED STATES PATENT OFFICE

OTTMAR WAHL, OF LEVERKUSEN, GERMANY, ASSIGNOR TO GENERAL ANILINE WORKS, INC., OF NEW YORK, N. Y., A CORPORATION OF DELAWARE

DYESTUFFS DERIVED FROM INDOLINE BASES AND PROCESS FOR PREPARING SAME

No Drawing. Application filed April 26, 1927, Serial No. 186,829, and in Germany May 3, 1926.

The present invention relates to new dyestuffs derived from indoline bases and process of preparing same.

I have found that by treating a 1.3.3-trialkyl-2-methylene indoline (such as 1.3.3-trimethyl-2-methylene indoline) of the formula:

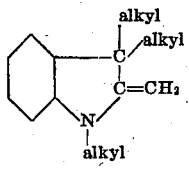

wherein the benzene nucleus may be substituted or not or a salt thereof of the formula:

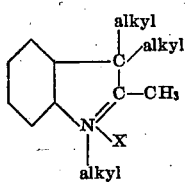

wherein the benzene nucleus may be substituted or not and X stands for an organic or inorganic acid radicle with an ester or a salt of nitrous acid in the presence of an organic acid anhydride, as for example acetic anhydride which serves as a condensing agent, there are produced new yellow to orange-red dyestuffs, which correspond probably to the general formula:

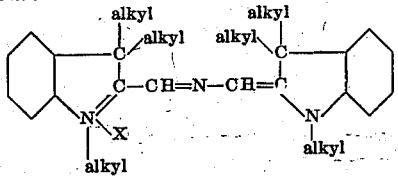

wherein the benzene nuclei may be substituted or not and X stands for an organic or inorganic acid radicle.

The new dyestuffs are yellow to orange-red crystalline powders soluble in water with light yellow to orange-red color. They dye natural and artificial silk and cotton when using tannin or other mordants, in beautiful greenish yellow to reddish-orange shades of good fastness to light.

The following examples will illustrate our invention, all parts being by weight:

Example 1

One part of 1.3.3-trimethyl-2-methylene indoline (see Berichte der Deutschen Chem. Gesellschaft, volume 23, page 2630, volume 31, page 612 and page 614) is dissolved in at least 1 part of acetic acid anhydride and 2 parts of sodium nitrite are gradually added with stirring. The solution soon becomes intensely yellow colored, which process may be accelerated by heating. When the indoline has disappeared, the reaction mass is run into water in order to destroy the acetic acid anhydride, and the dyestuff is salted out with sodium chloride and zinc chloride, if necessary, with the addition of sodium bisulphite, in order to destroy the excess of sodium nitrite. The new dyestuff has probably the formula:

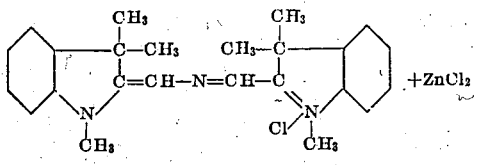

It is, a clear, greenish-yellow body, which dyes natural and artificial silk and cotton when using tannin or other mordants, in beautiful greenish-yellow shades of good fastness to light, to acids and to alkalies. Instead of sodium nitrite for example, amyl nitrite can be employed; the reaction can also be carried out in the presence of a solvent.

Example 2

1 part of 5-amido-1-3.3-trimethyl-2-methylene indoline are mixed with 1 part of powdered dry sodium nitrite and the mixture is slowly brought into 2 parts of acetic acid anhydride while stirring. Stirring is continued until the indoline has disappeared, then the reaction mass is run into water and the dyestuff, which dissolves in water with yellow-red color is salted out. It corresponds probably to the formula:

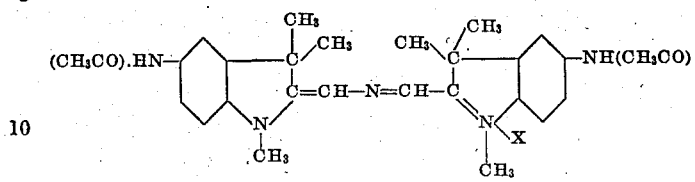

wherein X stands for an organic or inorganic acid radicle.

It is in a dry state an orange-red crystalline powder, easily soluble in water and diluted acids. It dyes natural and artificial silk and cotton when using tannin as mordant in reddish-yellow shades of quite good fastness to light.

I wish it to be understood that in the following claims one may use instead of a salt of the nitrous acid also an ester of the nitrous acid, and instead of a 1.3.3-trialkyl-2-methylene indoline a salt thereof.

I claim:

1. The process which consists in reacting with a salt of nitrous acid upon a 1.3.3-trialkyl-2-methlyene indoline of the general formula:

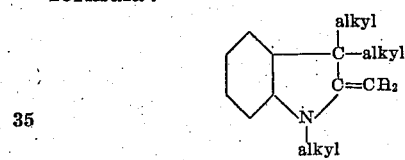

wherein the benezen nucleus may be substituted in the presence of acetic acid anhydride.

2. The process which consists in reacting with sodium nitrite upon 5-amino-1.3.3-trimethyl-2-methlyene indoline of the probable formula:

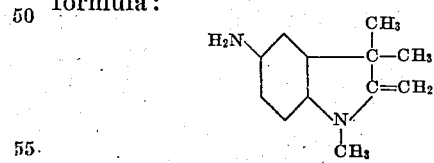

in the presence of acetic acid anhydride.

3. As new products dyestuffs corresponding probably to the general formula:

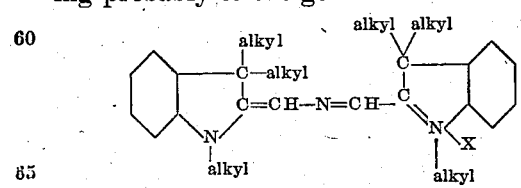

wherein the benzene nuclei may be substituted or not and X stands for an organic or inorganic acid radicle, which are in a dry state yellow to orange-red crystalline powders, soluble in water with light yellow to orange-red color, and which dye natural and artificial silk and cotton when using tannin or other mordants in beautiful greenish-yellow to reddish-yellow shades of good fastness to light.

4. As new products the dyestuffs corresponding probably to the general formula:

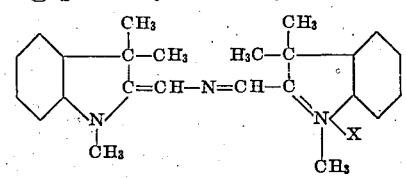

wherein X stands for an organic or inorganic acid radicle and wherein the benzene nuclei may be substituted, said products being in the dry state yellow to orange-red crystalline powders, soluble in water with light yellow to orange-red color dyeing natural and artificial silk and cotton, when using tannin or other mordants, beautiful greenish-yellow to reddish-yellow shades of good fastness to light.

5. As a new product a dyestuff corresponding probably to the general formula:

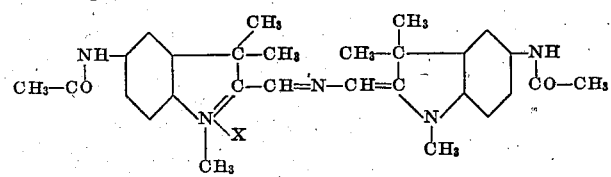

wherein X stands for an organic or inorganic acid radicle, which is in a dry state an orange-red crystalline powder, easily soluble in water and diluted acids, and which dyes natural and artificial silk and cotton when using tannin as a mordant in reddish-yellow shades of quite good fastness to light.

In testimony whereof, I affix my signature.

OTTMAR WAHL.